United States Patent
Wu et al.

(10) Patent No.: US 9,557,028 B2
(45) Date of Patent: *Jan. 31, 2017

(54) LENS FOR AN ILLUMINATING DEVICE

(71) Applicant: Genius Electronic Optical Co., Ltd., Taichung (TW)

(72) Inventors: Chih-Chieh Wu, Taichung (TW); Ya-Chieh Ho, Taichung (TW); Chun-Yi Yeh, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 65 days.

This patent is subject to a terminal disclaimer.

(21) Appl. No.: 14/643,005

(22) Filed: Mar. 10, 2015

(65) Prior Publication Data

US 2016/0146426 A1    May 26, 2016

(30) Foreign Application Priority Data

Nov. 21, 2014    (TW) .............................. 103140428 A

(51) Int. Cl.
| | |
|---|---|
| *F21V 5/00* | (2015.01) |
| *F21V 5/04* | (2006.01) |
| *G02B 19/00* | (2006.01) |
| *G02B 3/08* | (2006.01) |
| *F21V 5/02* | (2006.01) |
| *F21Y 101/00* | (2016.01) |

(52) U.S. Cl.
CPC ................ *F21V 5/045* (2013.01); *G02B 3/08* (2013.01); *G02B 19/0009* (2013.01); *G02B 19/0066* (2013.01); *F21V 5/02* (2013.01); *F21Y 2101/00* (2013.01)

(58) Field of Classification Search
CPC .............. F21V 5/04; F21V 5/02; F21V 5/025; G02B 3/08; G02B 19/0009; G02B 19/0066
USPC ......................................... 362/337
See application file for complete search history.

(56) References Cited

U.S. PATENT DOCUMENTS

| | | | |
|---|---|---|---|
| 8,163,580 B2 | 4/2012 | Daschner et al. | |
| 8,729,571 B2 | 5/2014 | Daschner et al. | |
| 2005/0121071 A1* | 6/2005 | Repetto | F24J 2/085 136/259 |
| 2011/0007505 A1* | 1/2011 | Wang | F21S 8/086 362/235 |

* cited by examiner

Primary Examiner — Karabi Guharay
Assistant Examiner — Jessica M Apenteng
(74) Attorney, Agent, or Firm — Jianq Chyun IP Office

(57) ABSTRACT

A lens includes a lens portion, an outer periphery and a prism portion. The lens portion is disposed at a middle portion of the lens, has an outline that is non-circular, and includes at least one curved surface. The outer periphery surrounds the lens portion. The prism portion is disposed between the lens portion and the outer periphery, and includes at least two undulated sections. Each undulated section has at least one undulated surface.

13 Claims, 11 Drawing Sheets

LENS FOR AN ILLUMINATING DEVICE

CROSS-REFERENCE TO RELATED APPLICATION

This application claims priority of Taiwanese Patent Application No. 103140428, filed on Nov. 21, 2014, the entire disclosure of which is hereby incorporated by reference.

FIELD OF THE INVENTION

This invention relates to a lens, more particularly to a lens for an illuminating device.

BACKGROUND OF THE INVENTION

U.S. Pat. No. 8,729,571 discloses a conventional Fresnel lens that is used in a flashlight of a camera. Two such Fresnel lenses can be respectively disposed on two LED chips to guide light emitted from the LED chips to a pre-determined position. Since the thickness of the Fresnel lens is relatively thin, the Fresnel lens is suitable for portable electronic devices, such as mobile phones or laptops.

Since the abovementioned Fresnel lens is cut based on a convex lens surface, the optical properties of the abovementioned Fresnel lens is the same as a convex lens. Therefore, the conventional Fresnel lens can only convert the light emitted from the LED chips to a specific area. As a result, the light shape after the light passes through the Fresnel lens is very simple, the angle of the light is unlikely to be effectively changed, and the light emitted from the LED chips cannot be effectively and uniformly mixed. Moreover, since each LED chip is a surface light source, the conventional Fresnel lens may not effectively guide all of the light beams emitted from the LED chips to a pre-determined position. That is to say, loss of light is unavoidable.

SUMMARY OF THE INVENTION

Therefore, an object of the present invention is to provide a lens that can overcome the aforesaid drawback of the prior art.

According to this invention, a lens includes a lens portion, an outer periphery and a prism portion. The lens portion is disposed at a middle portion of the lens, has an outline that is non-circular, and includes at least one curved surface. The outer periphery surrounds the lens portion. The prism portion is disposed between the lens portion and the outer periphery, and includes at least two undulated sections. Each undulated section has at least one undulated surface. Each undulated section has a center that is located in the middle portion of the lens.

By the presence of the lens portion along with the prism portion, light emitted from LED chips can be effectively and uniformly mixed, and light with a greater viewing angle can be direct to a pre-determined position so that intensity of illumination at the pre-determined position can be improved. The lens portion can enhance luminous efficiency, thereby reducing loss of light.

BRIEF DESCRIPTION OF THE DRAWINGS

Other features and advantages of the present invention will become apparent in the following detailed description of the embodiments of this invention, with reference to the accompanying drawings, in which.

DETAILED DESCRIPTION OF THE EMBODIMENTS

Figure 1:
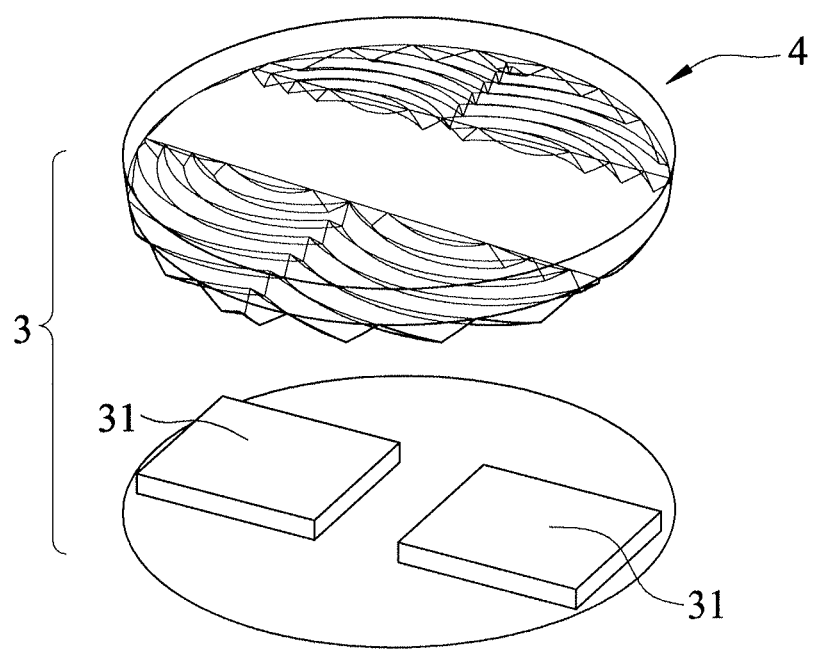
FIG. 1 is a partly exploded perspective view of the first embodiment of a lens according to this invention and two LED chips.

Before the present invention is described in greater detail, it should be noted that like elements are denoted by the same reference numerals throughout the disclosure.

Referring to FIGS. 1 to 4, the first embodiment of a lens 4 according to the present invention is adapted to be used in an illuminating device 3 of a portable electronic device, such as a mobile phone or a tablet. The illuminating device 3 includes a plurality of LED chips 31 and the lens 4. In this embodiment, the illuminating device 3 includes two LED chips 31 (see FIG. 1) that respectively have two different color temperatures (i.e., one has a cool color and the other one has a warm color). However, the color temperatures are not limited thereto and may vary to meet actual requirements.

The lens 4 is disposed on the LED chips 31 and includes a lens portion 5, an outer periphery 6 surrounding the lens portion 5, and a prism portion 7 disposed between the lens portion 5 and the outer periphery 6.

The lens portion 5 is disposed at a middle portion of the lens 4, has an outline 51 that is non-circular, covers the LED chips 31, and includes at least one curved surface.

Figure 2:
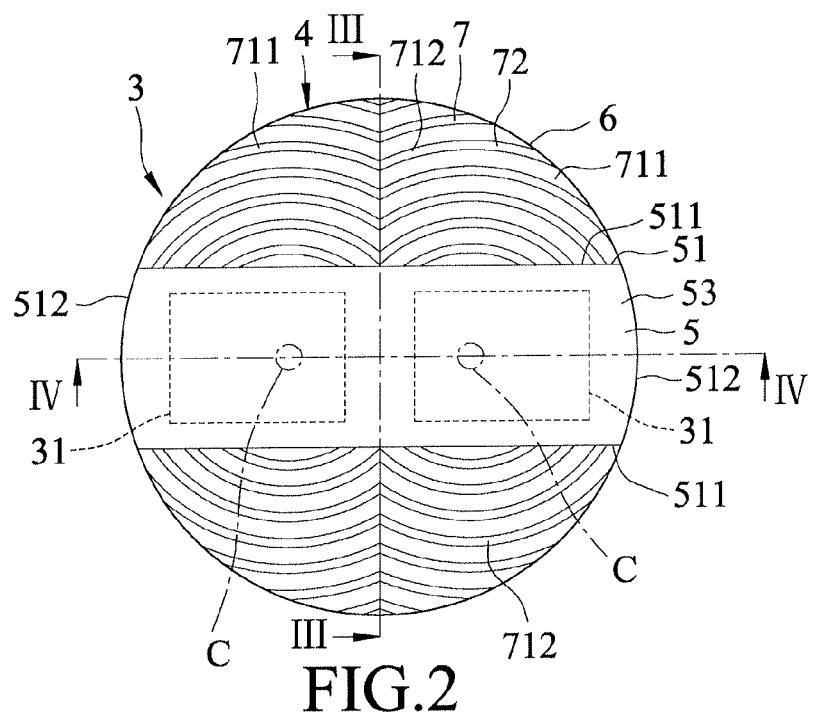
FIG. 2 is a front view of the first embodiment.
Figure 3:
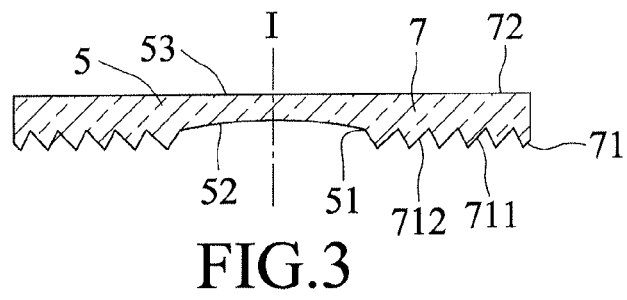
FIG. 3 is a sectional view of the first embodiment taken along line III-III in FIG. 2.

The outline 51 of the lens portion 5 has two long sides 511 that are spaced-apart from each other and two short sides 512 that are spaced-apart from each other and that are respectively connected to opposite ends of each of the long sides 511 to constitute the outline 51, as best shown in FIG. 2. The short sides 512 are disposed at the outer periphery 6 (see FIG. 2).

Figure 4:
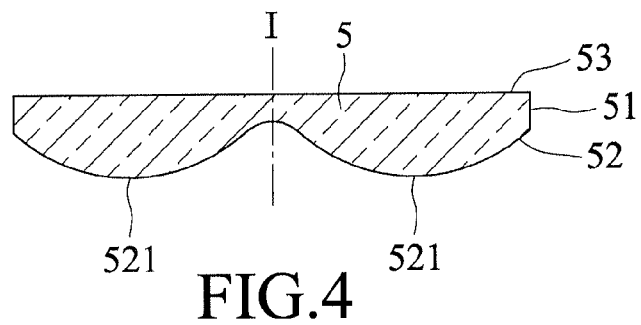
FIG. 4 is a sectional view of the first embodiment taken along line IV-IV in FIG. 2.
Figure 5:
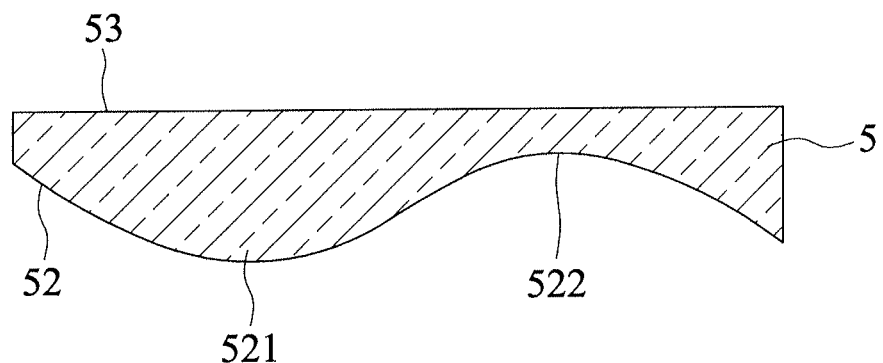
FIG. 5 is a sectional view of a variation of the first embodiment taken along line IV-IV in FIG. 2.
Figure 6:
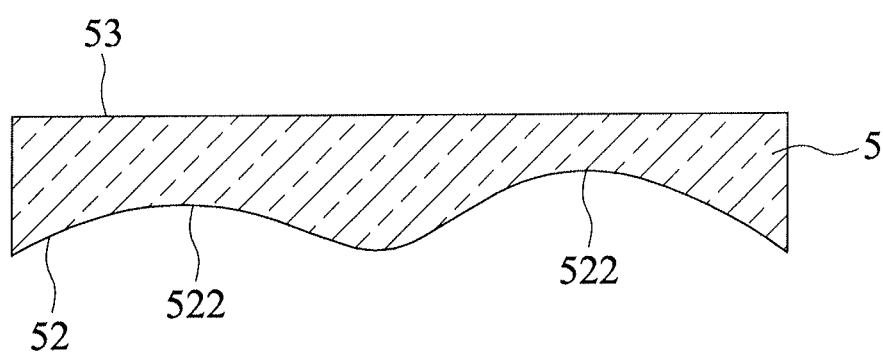
FIG. 6 is a sectional view of another variation of the first embodiment taken along line IV-IV in FIG. 2.
Figure 7:
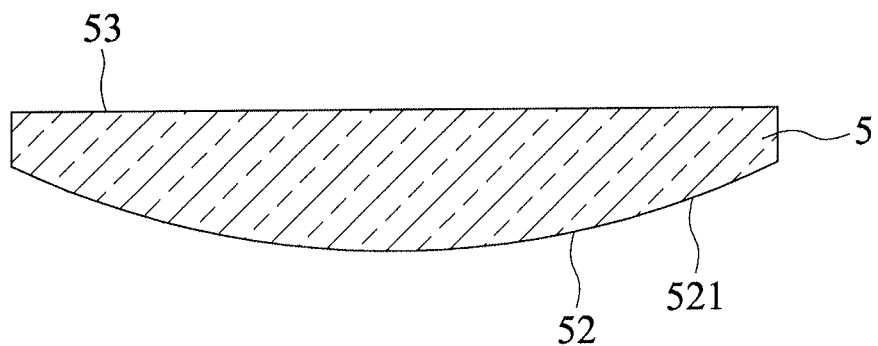
FIG. 7 is a sectional view of yet another variation of the first embodiment taken along line IV-IV in FIG. 2.
Figure 8:
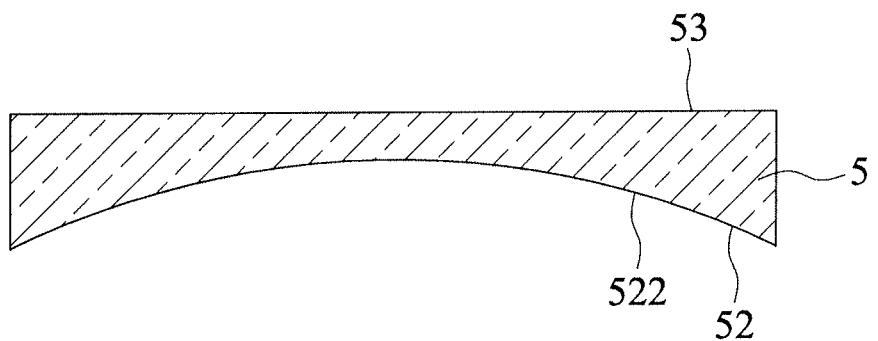
FIG. 8 is a sectional view of yet another variation of the first embodiment taken along line IV-IV in FIG. 2.

To be more specific, the lens portion 5 includes a light-input surface 52 that faces the LED chips 31, and a light-output surface 53 that is opposite to the light-input surface 52 (see FIG. 4). In this embodiment, the light-input surface 52 of the lens portion 5 is configured as a curved surface that has two convex regions 521 respectively facing the LED chips 31 (see FIG. 4). The light-output surface 53 of the lens portion 5 is configured as a flat surface. However, it should be noted that the configurations of both the light-input surface 52 and the light-output surface 53 in this embodiment should not be taken as limitations and may vary depending on actual requirements. In one example, the light-input surface 52 is a flat surface while the light-output surface is a curved surface. In another example, both the light-input and light-output surfaces 52, 53 are flat surfaces. In yet another example, both the light-input and light-output surfaces 52, 53 are curved surfaces.

The convex regions 521 of the light-input surface 52 guide most of the light emitted from the LED chips 31 to a desired position. In this embodiment, since light emitted from one of the LED chips 31 has a wavelength that is different from that of light emitted from the other one of the LED chips 31 (i.e., the LED chips have different color temperatures) and the light refraction angles of the convex regions 521 are different from each other, the convex regions 521 may be designed to have different curvatures so as to achieve a desired direction of light path.

Moreover, it should be noted that, the light-input surface 52 of the lens portion 5 is not limited thereto. FIGS. 5 to 8 show variations of the light-input surface 52 of the lens portion 5 of this embodiment. In one variation, the light-input surface 52 of the lens portion 5 is configured as a curved surface that has a convex region 521 and a concave region 522 (see FIG. 5). In another variation, the light-input surface 52 is configured as a curved surface that has two concave regions 522 (see FIG. 6). In yet another variation, the light-input surface 52 is configured as a curved surface that has a convex region 521 (see FIG. 7). In yet another variation, the light-input surface 52 is configured as a curved surface that has a concave region 522 (see FIG. 8).

In this embodiment, the outer periphery 6 of the lens 4 is circular. However, the shape of the outer periphery 6 is not limited thereto and may vary to meet actual requirements. In one example, the outer periphery 6 may be rectangular.

Referring to FIGS. 1 to 4, the prism portion 7 has a light-input surface 71 (see FIG. 3) that faces the LED chips 31, and a light-output surface 72 that is opposite to the light-input surface 71. The light-input surface 71 includes at least two undulated sections 711. In this embodiment, the light-input surface 71 includes two undulated sections 711 that respectively correspond to the LED chips 31. Each undulated section 711 has at least one undulated surface 712. In this embodiment, each undulated section 711 has two undulated surfaces 712 (see FIG. 2). The light-output surface 72 is configured as a flat surface. Each undulated section 711 has a center (C) that corresponds in position to a respective one of the LED chips 31. In this embodiment, each undulated section 711 includes a plurality of concentric prisms that are centered at the center (C) of the undulated section 711. That is to say, each undulated section 711 has a pattern that is substantially concentric with respect to the center (C) and that is constituted by a plurality of prisms connected to one another. In other words, each undulated section 711 is constituted by a plurality of inclined surfaces that are connected to one another and that surround the center (C) of the undulated section 711. The light emitted from the LED chips 31 with a greater viewing angle is reflected (e.g., by total reflection) or refracted by the lens to a pre-determined position, thereby effectively gathering the light with a greater viewing angle to enhance luminous efficiency. However, it should be noted that, the shape of the pattern is not limited thereto and may vary depending on actual requirements. For example, the pattern may also be configured as a plurality of ellipses (see FIGS. 16 to 18) or a plurality of rectangles (see FIG. 19). The shape of the pattern is designed to adjust luminous points and to fit different requirements of the portable device. Each undulated section 711 guides a part of the light emitted from the LED chips 31 to a desired position through reflection, total reflection or refraction effect.

A part of the curved surface has a maximum thickness greater than a maximum thickness of the prism portion 7. In this embodiment, each vertex region 521 of the lens portion 5 has a maximum thickness greater than that of the prism portion 7.

The ratio of a projected area of the lens portion 5 along an optical axis (I) (see FIGS. 3 and 4) of the lens 4 to a projected area of the lens 4 along the optical axis (I) is between 0.2 and 0.6. Preferably, the ratio is between 0.25 and 0.55. In this embodiment, the ratio is 0.44. Under such condition, most of the light emitted from the LED chips 31 can be refracted to a desired position through the lens portion 5, Furthermore, the presence of the prism portion 7 allows the lens 4 to maintain in a thin and lightweight condition.

Figure 9:
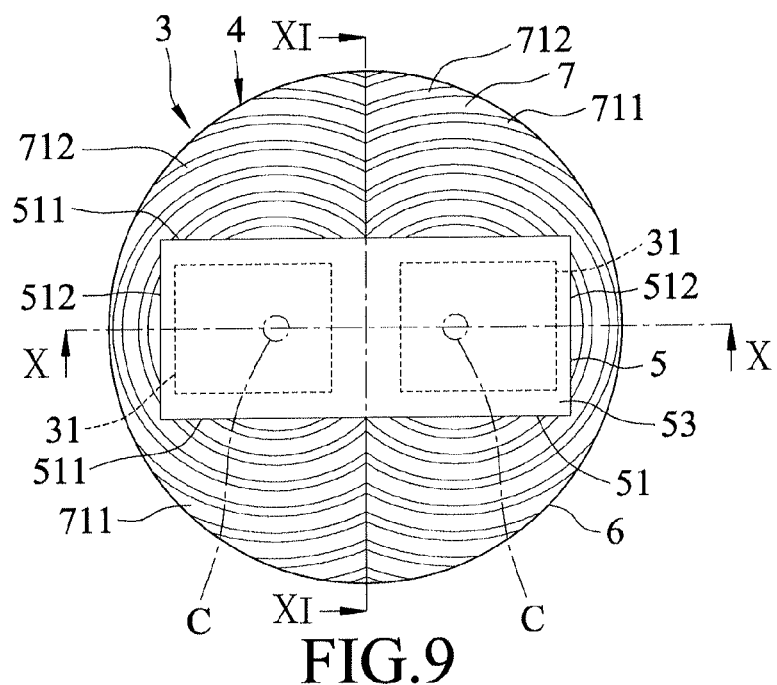
FIG. 9 is a front view of the second embodiment of a lens according to this invention.
Figure 10:
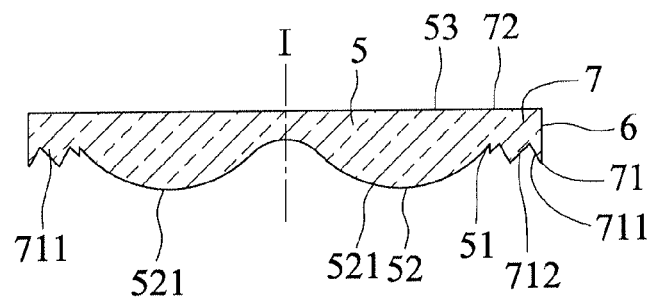
FIG. 10 is a sectional view of the second embodiment taken along line X-X in FIG. 9.
Figure 11:
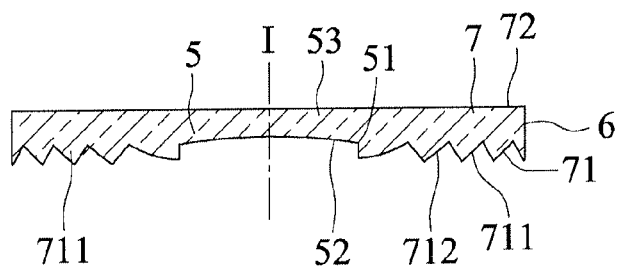
FIG. 11 is a sectional view of the second embodiment taken along line XI-XI in FIG. 9.
Figure 12:
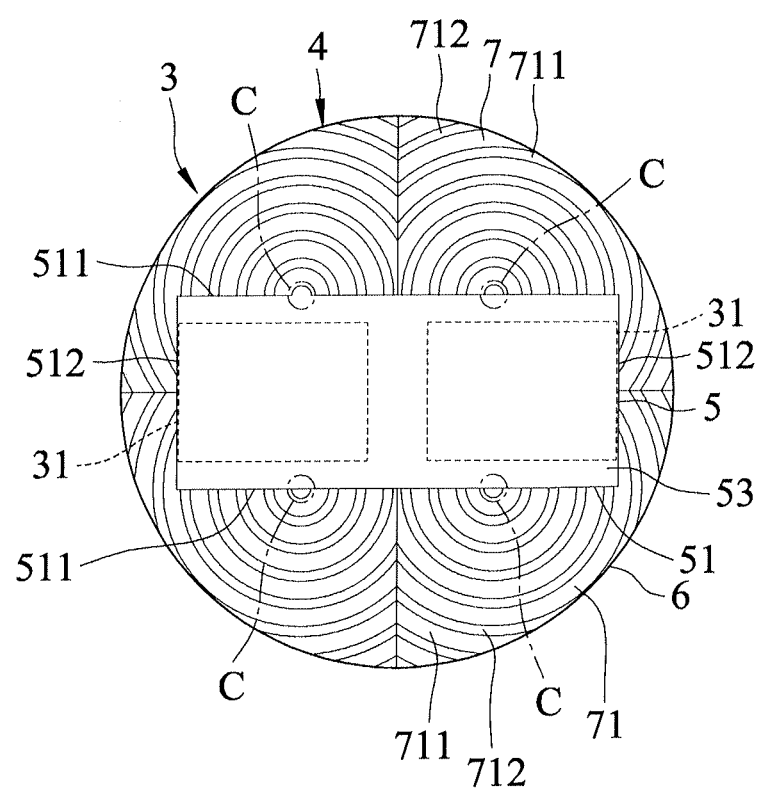
FIG. 12 is a front view of a variation of the second embodiment.

Referring to FIGS. 9 to 11, the second embodiment of a lens according to this invention is similar to that of the first embodiment, except that the outline 51 of the lens portion 5 is rectangular (see FIG. 9), that each undulated section 711 has only one undulated surface 712, and that the prism portion 7 is disposed around the outline 51 of the lens portion 5. That is to say, the undulated surfaces 712 surround the lens portion 5. As such, the second embodiment can also achieve the same effect as the first embodiment. It is worth noting that, as shown in FIG. 12, in a variation of the second embodiment, the prism portion 7 includes four undulated sections 711. Two of the centers (C) of undulated sections 711 are disposed at a side of the lens portion 5, and the other two of the centers (C) of undulated sections 711 are disposed at an opposite side of the lens portion 5 (see FIG. 12).

Figure 13:
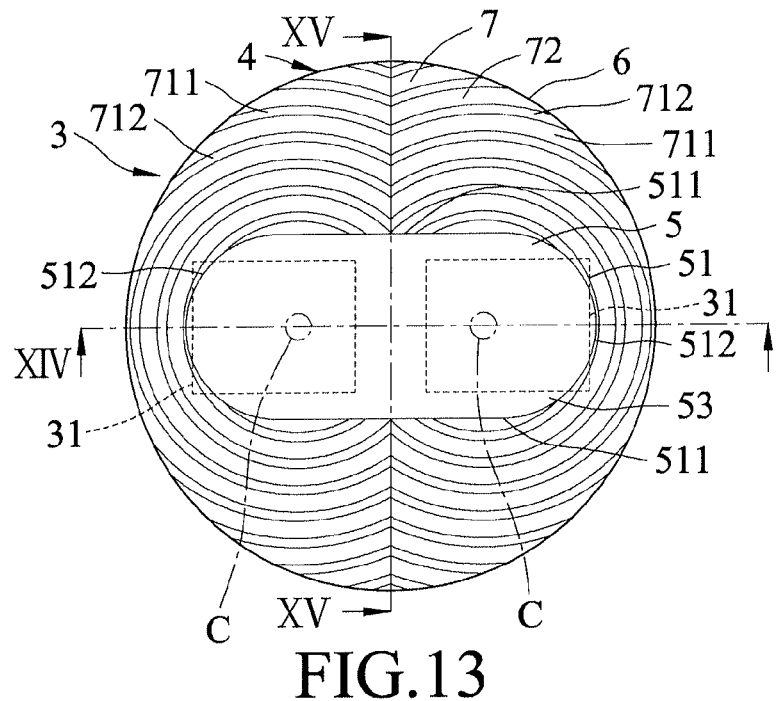
FIG. 13 is a front view of the third embodiment of a lens according to this invention.
Figure 14:
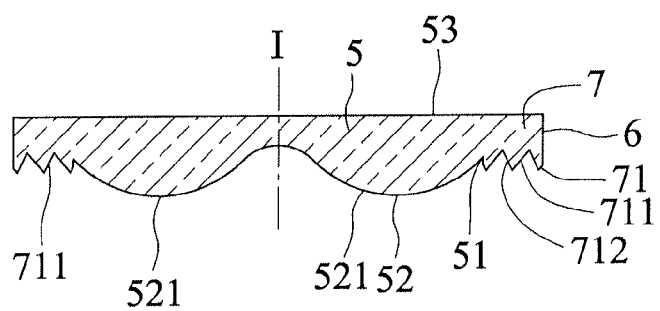
FIG. 14 is a sectional view of the third embodiment taken along line XIV-XIV in FIG. 13.
Figure 15:
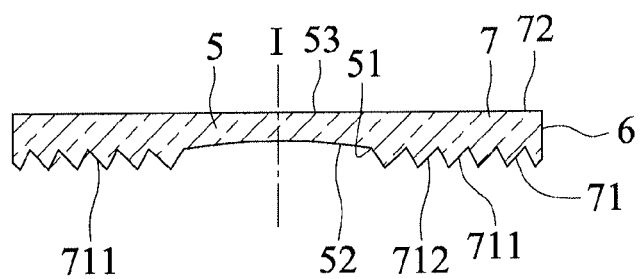
FIG. 15 is a sectional view of the third embodiment taken along line XV-XV in FIG. 13.

Referring to FIGS. 13 to 15, the third embodiment of a lens according to this invention is similar to that of the second embodiment, except that the outline 51 of the lens portion 5 has two long sides 511 that are spaced-apart from each other and two short sides 512 that are spaced-apart from each other and that are respectively connected to opposite ends of each of the long sides 511 to constitute the outline 51, and that each of the long sides 511 is straight and each of the short sides 512 is curved. In this embodiment, the short sides 512 with the curved shape provide an aesthetic appearance and a larger total area of the undulated sections 711 so as to gather light with a greater viewing angle and to guide light to a desired position. In this embodiment, the ratio of the projected area of the lens portion 5 along the optical axis (I) of the lens 4 to the projected area of the lens 4 along the optical axis (I) is 0.3.

Figure 16:
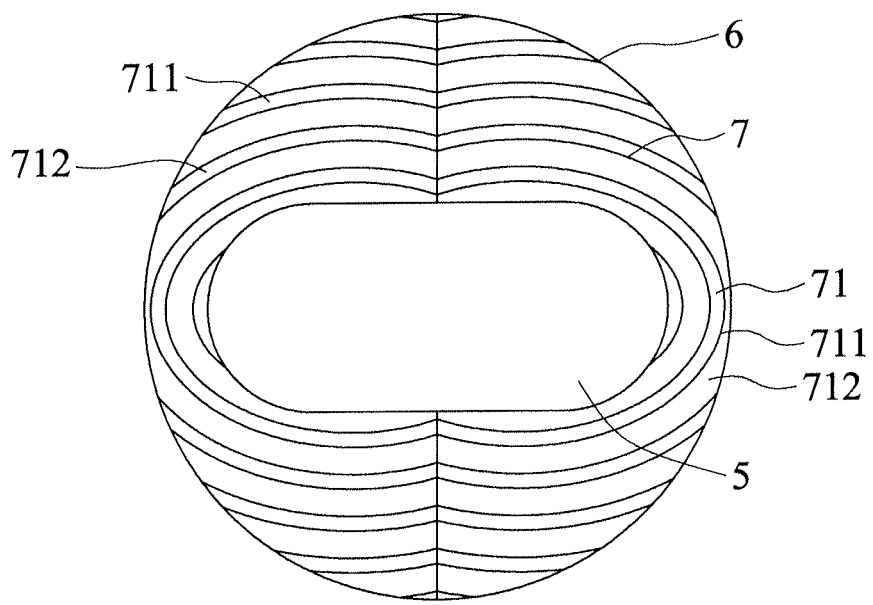
FIGS. 16 to 20 show variations of the third embodiment.
Figure 17:
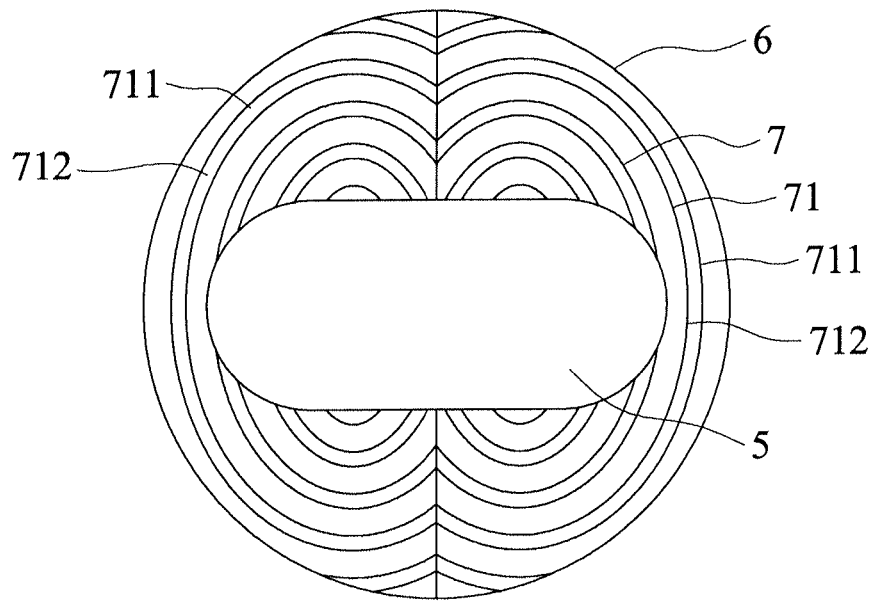
Figure 18:
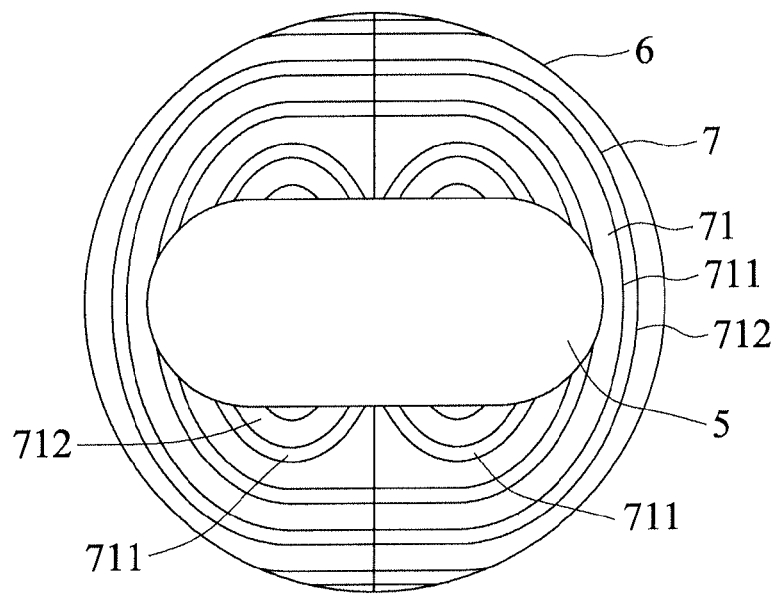
Figure 19:
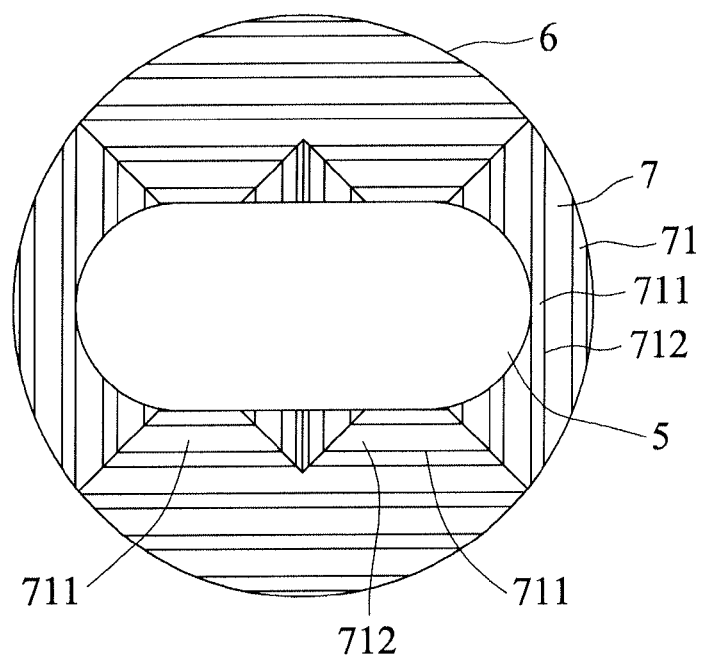
Figure 20:
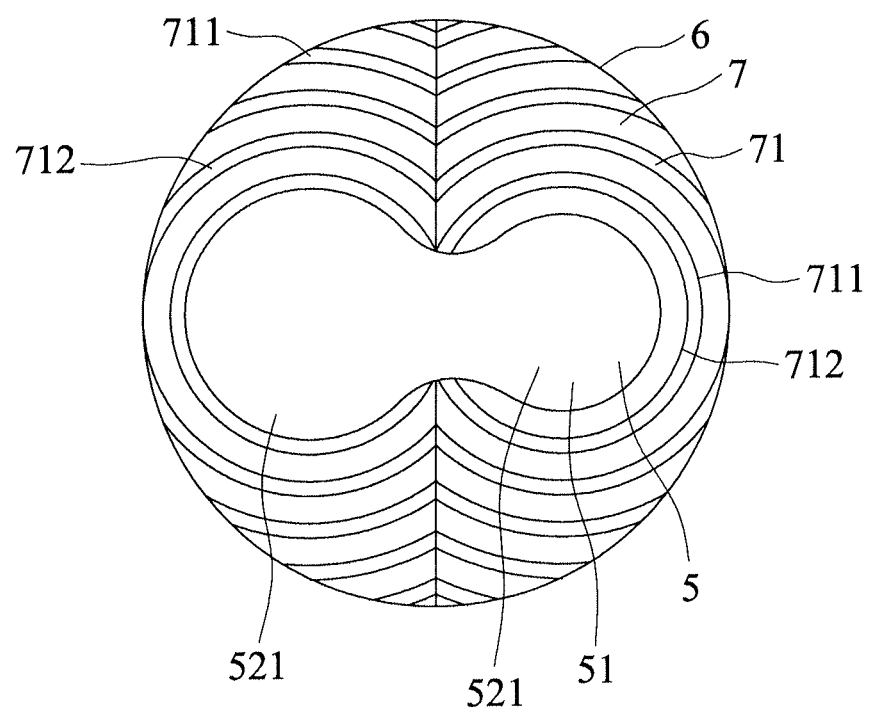

FIGS. 16 to 20 show variations of the third embodiment. Referring to FIGS. 16 to 18, the patterns of the undulated sections 711 are configured as a plurality of discontinuous ellipses. Referring to FIG. 19, the patterns of the undulated sections 711 are configured as a plurality of discontinuous rectangles. It should be noted that in FIGS. 18 and 19, the number of the undulated sections 711 is three. Moreover, one of the undulated sections 711 is disposed around the other two of the undulated sections 711, and has a center that is located at the geometric center of the lens portion 5 so as to achieve a better light shape. FIG. 20 shows that the convex regions 521 of the light-input surface 52 have different curvature radiuses and different surface areas so as to achieve an outstanding light mixing effect or to achieve a light shape which is different from that of the second embodiment.

Figure 21:
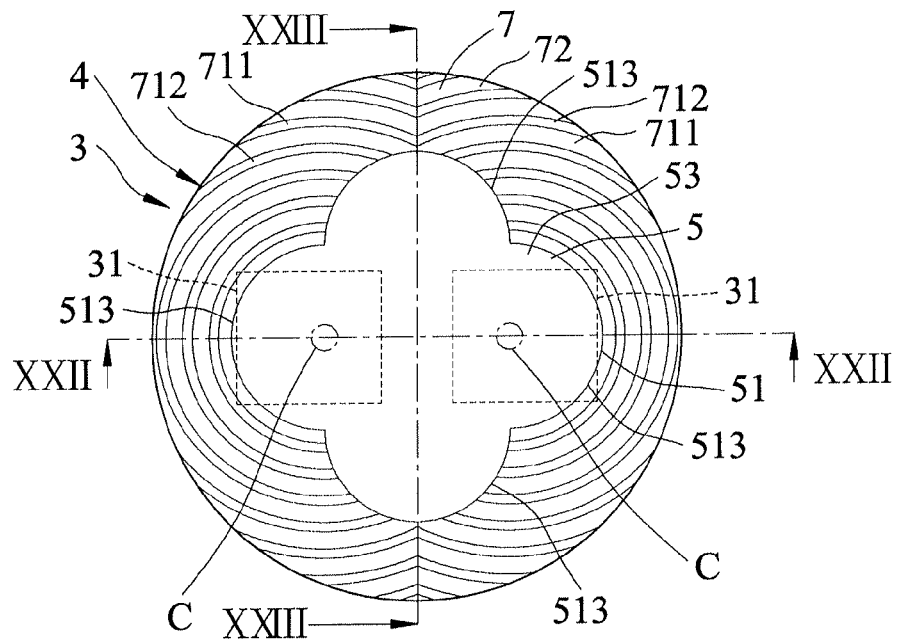
FIG. 21 is a front view of the fourth embodiment of a lens according to this invention.
Figure 22:
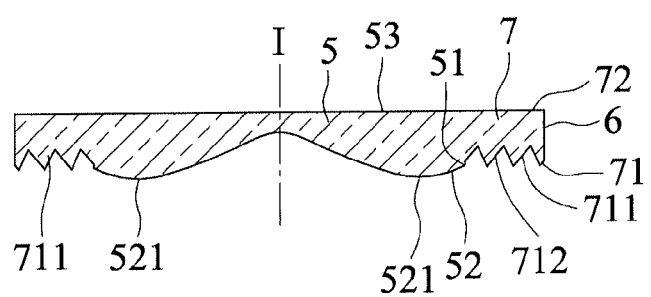
FIG. 22 is a sectional view of the fourth embodiment taken along line XXII-XXII in FIG. 21.
Figure 23:
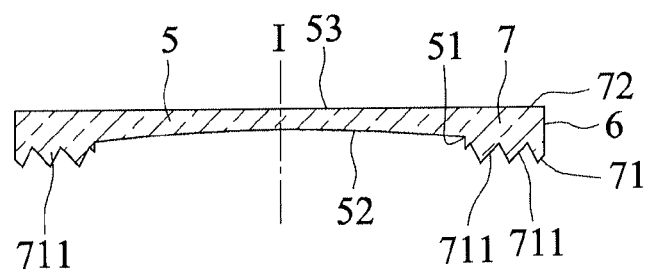
FIG. 23 is a sectional view of the fourth embodiment taken along line XXIII-XXIII in FIG. 21.

Referring to FIGS. 21 to 23, the fourth embodiment of a lens according to this invention is similar to that of the second embodiment, except that the outline 51 of the lens portion 5 has four curved sides 513. Each of which interconnects two adjacent ones of the curved sides 513 to constitute the outline 51 (see FIG. 21). As such, the fourth embodiment can achieve the same effect as that of the second embodiment. Moreover, the ratio of the light emitted from each of the LED chips 31 can be adjusted to form a different light shape (compared to the second embodiment) so as to achieve a better light mixing effect. It should be understood that in the second to fourth embodiments, the light-input surface 52 of the lens portion 5 can also be designed as shown in FIGS. 5 to 8.

To sum up, the lens portion 5 is capable of mixing the light uniformly and guiding most of the light emitted from the LED chips 31 to a desired position. Moreover, the light with a greater viewing angle can be direct to a pre-determined position so that intensity of illumination at the pre-determined position can be improved. Therefore, loss of light is reduced, thereby increasing the efficiency of the illuminating device.

While the present invention has been described in connection with what are considered the most practical embodiments, it is understood that this invention is not limited to the disclosed embodiments but is intended to cover various arrangements included within the spirit and scope of the broadest interpretation and equivalent arrangements.

What is claimed is:

1. A lens, comprising:
a lens portion disposed at a middle portion of said lens, having an outline that is non-circular, and including at least one curved surface;
an outer periphery surrounding said lens portion; and
a prism portion disposed between said lens portion and said outer periphery and including at least two undulated sections, each undulated section having at least one undulated surface.

2. The lens as claimed in claim 1, wherein a ratio of a projected area of said lens portion along an optical axis of said lens to a projected area of said lens along the optical axis is between 0.2 and 0.6.

3. The lens as claimed in claim 1, wherein a part of said curved surface has a maximum thickness greater than a maximum thickness of said prism portion.

4. The lens as claimed in claim 1, wherein said outline of said lens portion has two long sides that are spaced-apart from each other and two short sides that are spaced-apart from each other and that are respectively connected to opposite ends of each of said long sides to constitute said outline, said short sides being disposed at said outer periphery.

5. The lens as claimed in claim 1, wherein said prism portion is disposed around said outline of said lens portion.

6. The lens as claimed in claim 5, wherein said outline of said lens portion is rectangular.

7. The lens as claimed in claim 5, wherein said outline of said lens portion has two long sides that are spaced-apart from each other and two short sides that are spaced-apart from each other and that are respectively connected to opposite ends of each of said long sides to constitute said outline, each of said long sides being straight, each of said short sides being curved.

8. The lens as claimed in claim 5, wherein said outline of said lens portion has four curved sides, each of which interconnects two adjacent ones of said curved sides to constitute said outline.

9. The lens as claimed in claim 1, wherein said curved surface has at least one convex region.

10. The lens as claimed in claim 1, wherein said curved surface has a convex region and a concave region.

11. The lens as claimed in claim 1, wherein said curved surface has at least one concave region.

12. The lens as claimed in claim 1, wherein said prism portion includes four undulated sections, each of said undulated sections having a center, two of said centers of undulated sections being disposed at a side of said lens portion, the other two of said centers of undulated sections being disposed at an opposite side of said lens portion.

13. The lens as claimed in claim 1, wherein said curved surface has two convex regions.

* * * * *